J. M. JONES.
Shifting Bodies for Hand-Carts.
No. 163,078. Patented May 11, 1875.
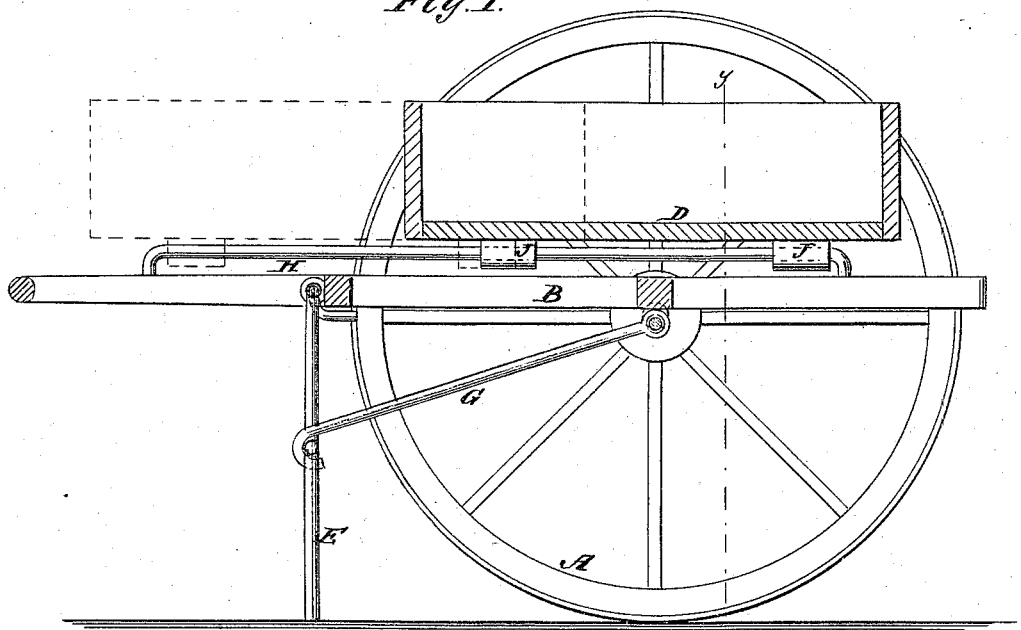
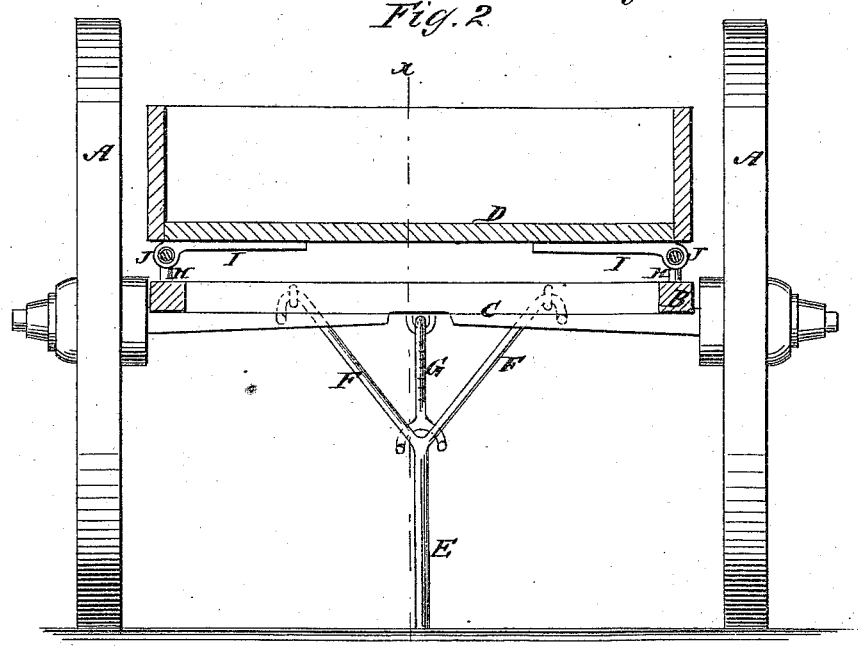

UNITED STATES PATENT OFFICE.

JOSEPH MATTHIAS JONES, OF PARIS, KENTUCKY.

IMPROVEMENT IN SHIFTING BODIES FOR HAND-CARTS.

Specification forming part of Letters Patent No. 163,078, dated May 11, 1875; application filed March 1, 1875.

*To all whom it may concern:*

Be it known that I, JOSEPH M. JONES, of Paris, in the county of Bourbon and State of Kentucky, have invented a new and useful Improvement in Hand-Vehicles, of which the following is a specification:

The invention relates to a hand-cart whose box or body is arranged to shift or slide along the frame, so that it may be adjusted forward of the axle to facilitate loading, or over the axle when loaded. The said body is supported by and slides on parallel rods or bars affixed to the frame of the cart, as hereinafter described.

Figure 1 is a vertical section of Fig. 2 taken on the line $x\,x$. Fig. 2 is a vertical section of Fig. 1 on the line $y\,y$.

Similar letters of reference indicate corresponding parts.

A represents the wheels of a cart. B is a frame, attached to the axle C of the cart. D is the bed or body of the cart. E is a stand, attached to the frame by the branches F F, and supported by the brace G. When the cart is stationary this stand rests upon the ground and supports the frame in a horizontal position. On the top side of the frame are two runners, H H, secured thereto in any substantial manner. These runners are made of either round or square or flat bars of metal, raised a little from the frame, as seen in the drawing. On the bottom of the bed or body D are clips I, having eyes J, which fit onto the runners, as seen in the drawing. These clip-eyes are loose on the runners, but attached rigidly to the bed, so that the latter can be moved forward from the axle, as seen in dotted lines, to allow the body to be filled without being obstructed by the wheel. These eyes may be in any form to suit the runner, and accomplish the object.

While being loaded, the body, when moved forward, will be supported by the stand E, and may then be moved back and balanced over the axle, as seen in the drawing.

I do not claim, broadly, a wagon provided with a shifting box or body; but

Having thus described my invention, I claim as new and desire to secure by Letters Patent—

The combination of the sliding box D and suitable supporting-clips I with the parallel runners H, frame B, and axle C, whereby said box is adapted to be shifted, as and for the purposes set forth.

JOSEPH MATTHIAS JONES.

Witnesses:
JOHN T. ISBELL,
PIERCE QUINLIN.